United States Patent [19]
Weems

[11] Patent Number: 5,367,768
[45] Date of Patent: Nov. 29, 1994

[54] METHODS OF REPAIRING INCONEL 600 NOZZLES OF PRESSURIZED WATER REACTOR VESSELS

[75] Inventor: Sterling J. Weems, Chevy Chase, Md.

[73] Assignee: MPR Associates, Inc., Alexandria, Va.

[21] Appl. No.: 992,224

[22] Filed: Dec. 17, 1992

[51] Int. Cl.$^5$ .............................. B23P 15/00
[52] U.S. Cl. .................. 29/890.031; 29/890.036; 29/727
[58] Field of Search ............... 29/890.031, 890.036, 29/890.044, 727, 523, 522.1

[56] References Cited

U.S. PATENT DOCUMENTS

| | | |
|---|---|---|
| Re. 30,802 | 11/1981 | Rogers, Jr. . |
| 4,448,343 | 5/1984 | Kochka et al. . |
| 4,580,426 | 4/1986 | Zafred . |
| 4,586,249 | 5/1986 | Costlow et al. . |
| 4,592,577 | 6/1986 | Ayres et al. . |
| 4,639,994 | 2/1987 | Cooper, Jr. et al. . |
| 4,649,492 | 3/1987 | Sinha et al. . |
| 4,649,493 | 3/1987 | Castner et al. . |
| 4,653,164 | 3/1987 | Cooper, Jr. et al. . |
| 4,724,693 | 2/1988 | Tedder . |
| 4,779,445 | 10/1988 | Rabe . |
| 4,783,890 | 11/1988 | Gaudin . |
| 4,793,044 | 12/1988 | Cartry et al. . |
| 4,827,594 | 5/1989 | Cartry et al. . |
| 4,847,967 | 7/1989 | Gaudin . |
| 5,027,507 | 7/1991 | Nelson et al. . |
| 5,062,199 | 11/1991 | Kelly ............................... 29/727 |
| 5,101,559 | 4/1992 | Gelpi et al. . |
| 5,149,490 | 9/1992 | Brown et al. ............. 29/890.031 |

OTHER PUBLICATIONS

Installation at Big Rock Point, 1979.
Installation at Oyster Creek, Nine Mile Point, 1974.

*Primary Examiner*—Irene Cuda

[57] ABSTRACT

A method of repairing a tubular nozzle made of Inconel 600 material and extending through a bore in an external wall of a pressure vessel to provide communication with the interior of the vessel from externally thereof includes mechanically rolling the inside diameter of a portion of the nozzle disposed within the external wall with a roll pressure in the range of 50,000 to 150,000 psi to form a circumferential rolled section in the nozzle having a wall thickness 3% to 12% less than the wall thickness of non-rolled sections of the nozzle, an outside diameter less than 1% greater than the outside diameter of the non-rolled sections and transition segments with a radius of curvature in the range of ½ inch to 2 inches joining the rolled section to the non-rolled sections. A stress of approximately 60,000 psi is created in the nozzle along the rolled section to produce surface yielding of the outside diameter of the nozzle, and an interference fit pressure in excess of the equipment operating pressure for the vessel is created between the outside diameter of the nozzle and the external wall of the vessel. A tubular sleeve made in its entirety of Inconel 690 material can be positioned in the previously rolled nozzle to extend along the entire length of the nozzle susceptible to cracking, and the inside diameter of the sleeve rolled along the entire length of the sleeve to create an interference fit between the outside diameter of the sleeve and the inside diameter of the nozzle.

20 Claims, 2 Drawing Sheets

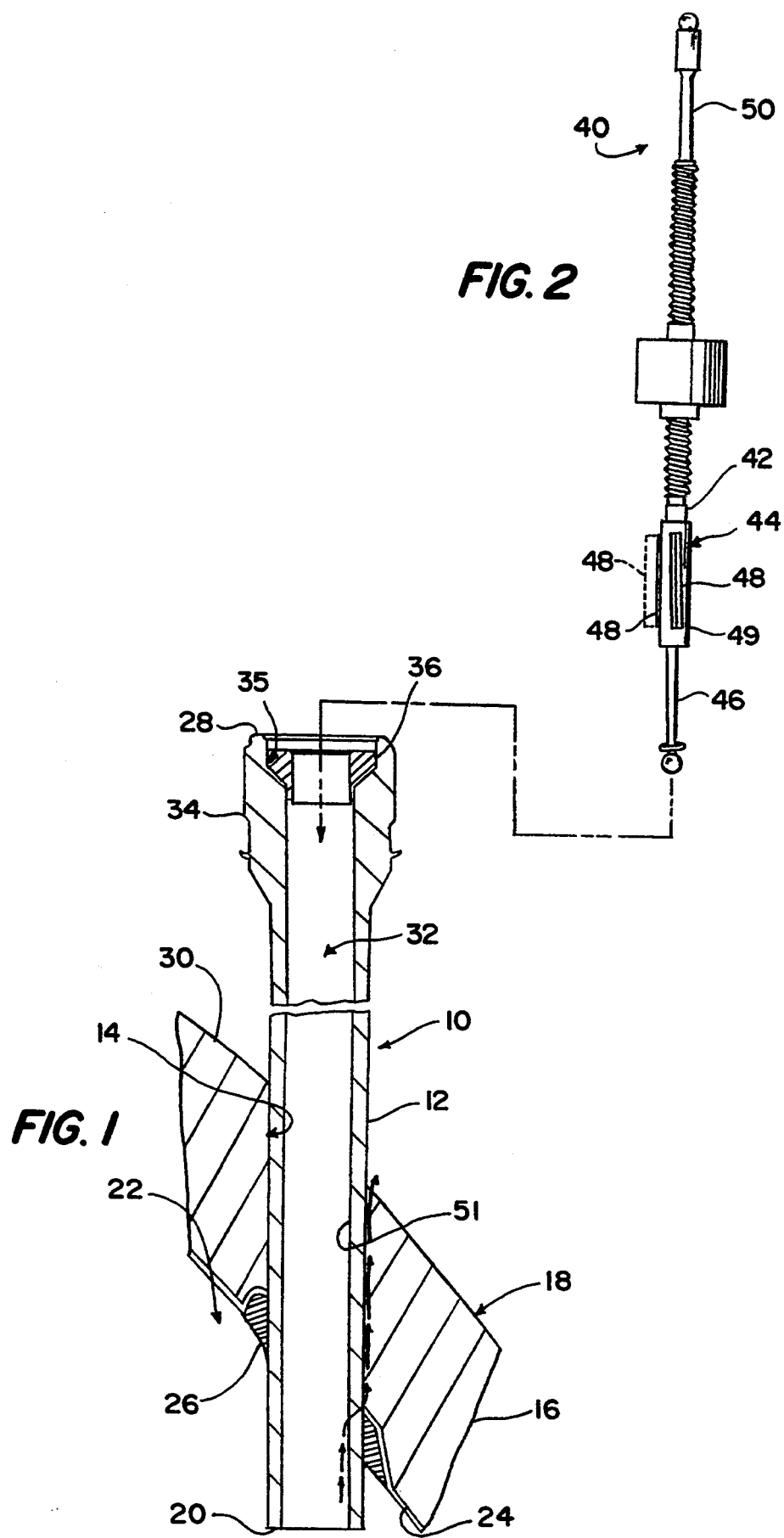

METHODS OF REPAIRING INCONEL 600 NOZZLES OF PRESSURIZED WATER REACTOR VESSELS

BACKGROUND OF THE INVENTION

1. Field of the Invention

The present invention relates to methods of repairing nozzles made of Inconel 600 material and providing communication between the interiors of pressure vessels and externally thereof and, more particularly, to methods of repairing Inconel 600 nozzles of reactor vessels of pressurized water reactors.

2. Description of the Prior Art

Pressure vessels and, in particular, reactor vessels of pressurized water reactors, typically have one or more nozzles disposed along external boundaries or walls of the vessels to provide communication with the interiors of the vessels from externally thereof. The nozzles include tubes or sleeves that extend through apertures or bores in the external walls, the external walls providing an interface between the interiors of the vessels and the environment. The nozzles can extend beyond interior surfaces of the external walls to protrude into the interiors of the vessels or can be substantially flush with the interior surfaces for being secured to the vessels by welding along the interior surfaces. The nozzles extend externally of the vessels; and, accordingly, the nozzles form continuations or extensions of the external boundaries of the vessels with the lumens or passages of the nozzles providing access to the interiors of the vessels from externally thereof. Various diverse procedures can be performed via the nozzles in accordance with the specific characteristics and functions of the vessels, and various tools or instruments can be inserted into the interiors of the vessels through the nozzles for various different procedures. Some of the procedures or functions that can be performed with the nozzles include control rod drive penetration, heater penetration, pressure tap and measurement, thermowell and instrument line conduit. Because the nozzles form extensions of the external boundaries of the vessels, it is extremely important to prevent cracking of the nozzles and concomitant leakage through and around the nozzles so as not to break the interface between the vessel interiors and the environment. Although nozzles of the above-described type have been made of Inconel 600 material to resist degradation and cracking, walls of the nozzles in the areas of the welds remain susceptible to cracking due to weld stress, corrosion, service induced stress corrosion as well as other effects. When such cracks occur, leak paths are established through the walls of the nozzles, allowing fluid within the vessels to flow through the cracks and along the apertures or bores in the external walls of the vessels to penetrate the interface between the vessel interiors and the environment. Where the vessels contain radioactive fluids as in nuclear pressurized water reactors, leakage through and around the nozzles can result in radioactive water or steam contamination of areas where personnel are present and represents a significant problem. One way to repair cracked Inconel 600 nozzles is by welding; however, in many cases and, in particular, in nuclear pressurized water reactors, repair by welding results in numerous disadvantages including undesirably high radiation exposure for personnel, forced outage time and its attendant cost, and preparation and implementation costs. In nuclear pressurized water reactors, nozzle repair techniques are further limited by the unique requirements and conditions of nuclear power plants including high pressure hot water or steam service, the need for usability of the nozzles following repair and conformance with Nuclear Regulatory Commission Standards.

In the past, 304 stainless steel control rod drive penetration nozzles of reactor vessels of nuclear boiling water reactors have been repaired by rolling inside diameter surfaces of the nozzles. The 304 stainless steel control rod drive penetration nozzles repaired by rolling were not welded directly to the external walls of the reactor vessels but, rather, to 304 stainless steel stub tubes concentrically receiving portions of the nozzles protruding beyond the interior surfaces of the external walls. The stub tubes in turn were welded to the reactor vessels along the interior surfaces of the external walls, with the nozzles extending externally of the vessels through apertures or bores in the external walls. The walls of the stub tubes cracked in the vicinity of the welds securing the stub tubes to the external walls, allowing fluids in the vessels to flow through the cracks and along the apertures or bores. A tube rolling repair technique including rolling the inside diameters of the nozzles was utilized to repair leaking 304 stainless steel control rod drive penetration nozzles of nuclear boiling water reactors at Big Rock Point, Mich., in 1979, Nuclenor, Spain, in 1981 and Nine Mile Point, N.Y., in 1984. A similar tube rolling repair technique was utilized to repair leaking 304 stainless steel instrument penetration nozzles of nuclear pressurized water reactors at Garigliano Plant, Italy, in 1966 and Oyster Creek, N.J., in 1974. It is also known to apply radially outwardly directed forces to the inside diameters of heat exchanger tubes to expand the tubes within apertures of tube sheets or baffle plates to prevent rattling or striking of the tubes against the tube sheets or baffle plates, and U.S. Pat. Nos. 4,586,249 to Costlow et al, 4,649,429 to Sinha et al, 4,649,493 to Costner et al, 5,027,507 to Nelson et al and 5,101,559 to Gelpi et al are illustrative of such procedures. Leaking or degraded heat exchanger tubes have also been repaired by inserting sleeves within the tubes and thereafter expanding portions of the sleeves to create an interference fit between the sleeves and the tubes. U.S. Pat. Nos. Re. 30,802 to Rogers, Jr., 4,448,343 to Kochka et al, 4,580,426 to Zafred, 4,592,577 to Ayres et al, 4,639,994 and 4,653,164 to Cooper, Jr. et al, 4,724,693 to Tedder, 4,779,445 to Rabe, 4,783,890 and 4,847,967 to Gaudin and 4,793,044 and 4,827,594 to Cartry et al are exemplary of various sleeving procedures for repairing heat exchanger tubes.

SUMMARY OF THE INVENTION

Accordingly, it is a primary object of the present invention to overcome the aforementioned disadvantages of prior art methods of repairing Inconel 600 nozzles of pressure vessels and, in particular, reactor vessels of pressurized water reactors.

Another object of the present invention is to provide a method of repairing a nozzle made of Inconel 600 material and extending through an external wall of a pressure vessel to provide communication with the interior of the vessel from externally thereof, the nozzle having an outer diameter in the range of ½ inch to 6 inches.

A further object of the present invention is to provide a method of repairing an Inconel 600 nozzle extending through an external wall of a pressure vessel to form a continuation or extension of the external boundary of the pressure vessel and having a wall thickness in the range of ⅛ inch to ¾ inch.

An additional object of the present invention is to provide a method of repairing an Inconel 600 nozzle of a pressure vessel including the step of mechanically rolling the inside diameter of a portion of the nozzle disposed within the external wall of the pressure vessel with a roll pressure in the range of 50,000 to 150,000 psi to form a circumferential rolled section in the nozzle.

A still further object of the present invention is to provide a method of repairing an Inconel 600 nozzle of a pressure vessel including the step of forming a specific rolled section in the nozzle by rolling the inside diameter of the nozzle with a roll tool.

Yet another object of the present invention is to provide a method of repairing an Inconel 600 nozzle of a pressure vessel including the step of forming a circumferential rolled section in the nozzle to have a wall thickness 3% to 12% less than the wall thickness of unrolled sections of the nozzle.

It is also an object of the present invention to provide a method of repairing an Inconel 600 nozzle of a pressure vessel including the step of forming a circumferential rolled section in the nozzle to have an outer diameter less than 1% greater than the outer diameter of unrolled sections of the nozzle.

The present invention has as a further object to provide a method of repairing an Inconel 600 nozzle of a pressure vessel including the step of applying roll pressure to the inside diameter of the nozzle to cause surface yielding of the outside diameter of the nozzle along the portion of the nozzle extending through an external wall of the pressure vessel.

Another object of the present invention is to provide a method of repairing an Inconel 600 nozzle of a pressure vessel including the step of creating an interference fit pressure between the outside diameter of the nozzle and an external wall of the vessel of about 3,000 to 10,000 psi and in excess of the operating pressure for the vessel.

An additional object of the present invention is to provide a method of repairing an Inconel 600 nozzle of a pressure vessel including the steps of mechanically rolling the inside diameter of a portion of the nozzle disposed within an external wall of the vessel, inserting a tubular sleeve within the nozzle and rolling the inside diameter of the sleeve along the entire length thereof.

These and other objects, benefits and advantages are realized with the present invention as characterized in a method of repairing a tubular nozzle made of Inconel 600 material and extending through a bore in an external wall or boundary of a pressure vessel to provide communication with the interior of the vessel from the environment or externally thereof. In accordance with the present invention, a roll tool is inserted in the lumen of the nozzle, which has an outer diameter in the range of ½ inch to 6 inches and a wall thickness in the range of ⅛ inch to ¾ inch, and rolls of the roll tool are extended or expanded in a direction radially outwardly of a longitudinal axis of the nozzle to mechanically roll the inside diameter of a portion of the nozzle disposed within the external wall. A roll pressure in the range of 50,000 to 150,000 psi is applied to the nozzle with the roll tool to form a circumferential rolled section in the nozzle having a wall thickness 3% to 12% less than the wall thickness of non-rolled sections of the nozzle and an outside diameter less than 1% greater than the outside diameter of the non-rolled sections. The roll pressure creates a stress of approximately 60,000 psi in the nozzle along the section being rolled to produce surface yielding of the outer diameter of the nozzle to conform to irregularities in the external wall. The specifically formed rolled section creates an interference fit pressure between the outside diameter of the nozzle and the external wall of the vessel of about 3,000 to 10,000 psi and in excess of the equipment operating pressure for the vessel so as to resist leakage around the nozzle along the bore in the external wall. With formation of the rolled section, transition segments connecting the rolled section to non-rolled sections of the nozzle are also formed. The transition segments are gentle and not abrupt, having a radius of curvature in the range of ½ inch to 2 inches to minimize tensile residual stress. A shot peening tool or a plating tool can be inserted in the lumen of the nozzle to shot peen or plate, respectively, the transition segments as further ensurance against future cracking along the transition segments. According to a modification of the repair method, a sleeve made in its entirety of Inconel 690 material is inserted in the lumen of the previously rolled nozzle to extend along the entire length of the nozzle susceptible to cracking. The inside diameter of the sleeve is rolled along the entire length thereof to create an interference fit between the outside diameter of the sleeve and the inside diameter of the nozzle.

Other objects and advantages of the present invention will become apparent from the following description of the preferred embodiment taken in conjunction with the accompanying drawings wherein like parts in each of the several figures are identified by the same reference characters.

BRIEF DESCRIPTION OF THE DRAWINGS

FIG. 1 is a broken sectional view of an Inconel 600 nozzle of a reactor vessel showing a leakage path through and around the nozzle.

FIG. 2 is a plan view of a roll tool to be inserted in the nozzle of FIG. 1.

DESCRIPTION OF THE PREFERRED EMBODIMENTS

Figure 4:
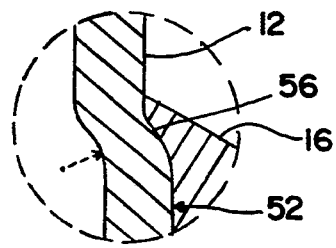
FIG. 4 is an enlarged, broken sectional view of the outboard transition segment disposed between rolled and non-rolled sections of the nozzle of FIG. 3.

A method of repairing Inconel 600 nozzles of pressure vessels in accordance with the present invention is illustrated in FIGS. 1-4. The method is designed for use in repairing Inconel 600 nozzles of pressure vessels including reactor vessels, pressurizers and pipes and, in particular, reactor vessels of nuclear pressurized water reactors, one such nozzle being illustrated at 10 in FIG. 1. The nozzle 10 includes an elongate tubular or cylindrical member, such as a sleeve or tube 12, having an outer diameter or size to be received in an aperture or bore 14 extending through the thickness of an external wall or boundary 16 of a pressure vessel, such as reactor vessel 18. The outer diameter of tube 12 and the diameter or size of the bore 14 are selected such that the gap or clearance between the tube outer diameter and the vessel external wall is minimized. The tube 12 extends through the external wall 16 to terminate at an inner end 20 communicating with the interior 22 of the vessel. The inner end 20 can extend beyond an interior surface 24 of the external wall 16 to protrude into the interior 22 as shown in FIG. 1, or the inner end 20 can be substantially flush with the interior surface 24. A weld 26 surrounds the tube 12 circumferentially along interior surface 24 and secures the nozzle 10 within the external wall of vessel 18. Tube 12 terminates exteriorly of vessel 18 at an outer end 28 that extends beyond an exterior surface 30 of the external wall 16, the distance that outer end 28 extends beyond the exterior surface 30 being dependent upon the function to be performed by the nozzle. A lumen or passage 32 of tube 12 extends between inner and outer ends 20 and 28 to provide communication with the interior 22 from externally of the reactor vessel. Various different procedures can be performed via nozzle 10, and various diverse instruments or tools can be inserted in the interior 22 through the lumen 32. Some of the procedures or functions that can be performed by the nozzle include control rod drive penetration, heater penetration, pressure tap and measurement, thermowell and instrument insertion conduit. The nozzle 10 illustrated in FIG. 1 is particularly useful as a control rod drive penetration and has an enlarged outer diameter portion 34 at outer end 28, an enlarged annular recess 35 in enlarged diameter portion 34 communicating with lumen 32 and a thermal sleeve 36 extending into the lumen 32, only a portion of the thermal sleeve 36 being shown in FIG. 1. The nozzle 10 forms an extension or continuation of the external boundary of the reactor vessel 18 as defined by external wall 16, the external wall 16 serving as an interface between the vessel interior 22 and the environment. Accordingly, nozzle as used herein refers to a continuation or extension of an external wall or boundary of a pressure vessel with a lumen or passage of the nozzle providing communication with the interior of the vessel from externally thereof. The nozzle 10 is made in its entirety of Inconel 600 material, an alloy including by weight 72% minimum nickel, 14% to 17% chromium, and 6% to 10% iron. The tube 12 has an outer diameter, excluding the enlarged diameter portion 34, of ½ inch to 6 inches and a wall thickness, excluding the enlarged diameter portion 34, of ⅛ inch to ¾ inch. Where provided, enlarged diameter portion 34 can have an outer diameter greater than the outer diameter of the remainder of the tube, and the wall thickness of the tube can be greater along the enlarged diameter portion such that lumen 32 can be of uniform or constant cross-section along the entire length of the nozzle where recess 35 is not provided or substantially the entire length of the nozzle where recess 35 is provided as shown in FIG. 1. When a crack occurs in the wall of nozzle 10 in the area of weld 26, a leak path is established from lumen 32 through the crack and along the gap or clearance between the outer diameter of tube 12 and the external wall 16 along bore 14 as shown by the arrow in FIG. 1. Fluids, which can be high pressure hot water or steam as well as radioactive, within the interior 22 of the vessel 18 can penetrate the external boundary or interface and contaminate the environment.

The method of the present invention involves mechanically rolling the inside diameter of nozzle 10 to obtain a specific rolled area, and a roll tool for rolling the inside diameter of nozzle 10 in accordance with the method of the present invention is illustrated in FIG. 2 at 40. Roll tool 40 includes a cylindrical housing 42, a roller assembly 44 mounted on housing 42 and a tapered mandrel 46 for actuating roller assembly 44. Roller assembly 44 includes a plurality of elongate rolls 48 rotatably mounted in slots in a roll cage 49 of housing 42, the rolls 48 being disposed at an angle with a longitudinal axis of the roll tool. The rolls 48 are movable between an initial, non-expanded or non-extended position wherein outer surfaces of the rolls are substantially flush or flush with an outer surface of the roll cage 49 and an expanded or extended position illustrated in dotted lines in FIG. 2 wherein the rolls 48 are disposed radially outwardly of the outer surface of the roll cage 49. Mandrel 46 extends through a central, longitudinal drive bore in housing 42 and is longitudinally extendable and retractable along the bore in response to rotation of a drive shaft 50 coupled with mandrel 46. Upon rotation of drive shaft 50 in a predetermined direction, mandrel 46 is moved forwardly, longitudinally along the drive bore to rotate rolls 48 and move them in a radially outward direction to the expanded position, with the distance that mandrel 46 is moved forwardly controlling the distance that rolls 48 are moved radially outwardly to the extended or expanded position. Roll tool 40 is illustrated by way of example in that other similar types of roll tools for mechanically rolling the inside diameters of tubes can be utilized with the present invention, one such roll tool being manufactured by Dresser Industries.

Figure 3:
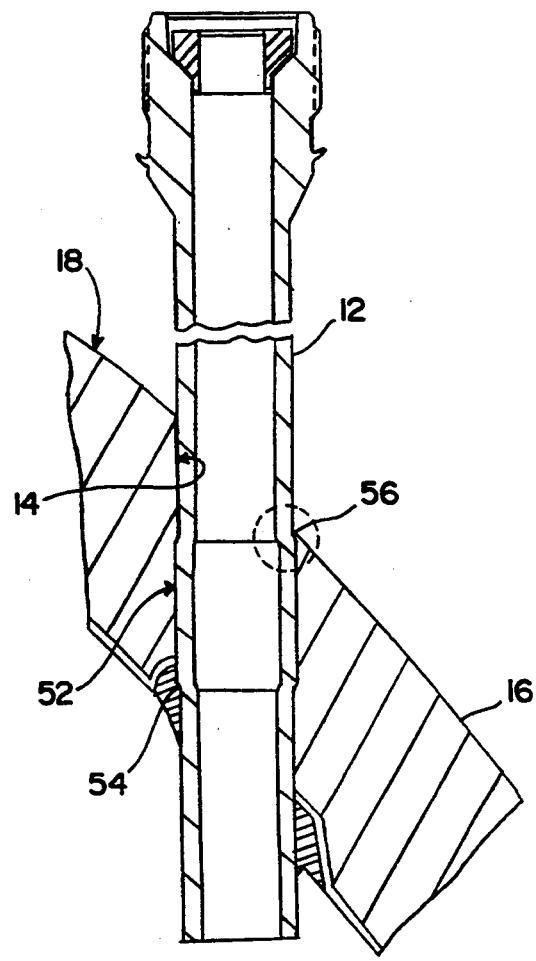
FIG. 3 is a broken sectional view of the nozzle of FIG. 1 following rolling of the inside diameter of the nozzle with the roll tool of FIG. 2.

In accordance with the method of the present invention, roll tool 40 is inserted, from externally of the reactor vessel 18, into the lumen 32 of nozzle 10 with the rolls 48 in the non-extended or a partially extended position to allow passage of the roll tool along lumen 32. Alternatively, the roll tool can be inserted from inside the vessel. Rolls 48 are positioned in lumen 32 to be disposed in a portion of tube 12 that is within the thickness of external wall 16. Once rolls 48 have been properly positioned, drive shaft 50 is rotated, such as by a hydraulic motor, to move mandrel 46 longitudinally, forwardly causing rolls 48 to be rotated and moved or cammed radially outwardly to forcefully engage and mechanically roll the inside diameter, i.e. inside diameter surface 51, of tube 12. Mandrel 46 is moved forwardly to rotate rolls 48 and extend the rolls in a direction radially outwardly of a longitudinal axis of the nozzle such that the roll pressure applied by the rolls to the inside diameter surface 51 of tube 12 is in the range of 50,000 to 150,000 psi and a specific circumferential rolled area 52 is formed in tube 12. Upon formation of the circumferential rolled area or section 52 in tube 12, roll tool 40 is withdrawn from the nozzle as shown in FIG. 3 thusly completing the repair. The exact pressure to be applied by the rolls will vary within the aforementioned range in accordance with the wall thickness of tube 12 so as to reduce the thickness of the tube wall by 3% to 12% along the length of the rolled area 52, increase the outer diameter of the tube along the length of the rolled area less than 1% and create a stress of approximately 60,000 psi in the tube wall along the rolled area, it being noted that the increase in the outer diameter for tube 12 is shown exaggerated in FIG. 3. At approximately 60,000 psi stress, surface yielding of the outer diameter of tube 12 along the rolled area 52 is obtained causing the tube outer diameter to conform to surface irregularities of the external wall 16 along bore 14 to seal off leakage. The rolled area 52 creates an interference fit pressure between the outer diameter of tube 12 and the vessel external wall 16 along the bore 14 in the range of 3,000 to 10,000 psi such that the tube outer diameter and the external wall 16 are maintained in intimate contact along the bore 14 when the vessel is pressurized, heated or cooled thusly sealing off leakage and structurally securing the nozzle 10 in the event of further stress corrosion cracking. The interference fit pressure created with the rolled area 52 is approximately 2,500 psi in excess of typical equipment operating pressures for reactor vessels such that vessel internal pressure along the bore 14 is counteracted. The length of the rolled area 52 is selected in accordance with the thickness of the external wall 16 to be the maximum possible while remaining within the thickness of the external wall 16, the length of the rolled area 52 being 1 to 4 times the outer diameter of the tube 12. With formation of rolled area 52, circumferential inboard and outboard transition segments 54 and 56, respectively, are formed in tube 12, the transition segments being disposed between the rolled area 52 and adjacent non-rolled sections of the tube 12. As illustrated in FIG. 4, wherein only the outboard transition segment 56 is shown, the transition segments connect opposing ends of rolled area 52 to adjacent non-rolled sections of tube 12 smoothly and gently, and not abruptly, the transition segments being shown exaggerated in FIG. 4. The transition segments 54 and 56 have a radius of curvature as illustrated by the dotted line arrow in FIG. 4 of ¼ inch to 2 inches to achieve a smooth transition between rolled and non-rolled sections of the tube. The specific configuration of the transition segments 54 and 56 minimizes tensile residual stress to less than approximately 10,000 psi to avoid future stress corrosion cracking along the transition segments.

To further ensure against future cracking along the transition segments 54 and 56, a shot peening tool (not shown) can be inserted in the lumen 32 in the same manner as that described for roll tool 40, and the inside diameter surface 51 of tube 12 can be shot peened with the peening tool along the transition segments. Shot peening of the transition segments results in the interior surfaces thereof being placed in a compressive stress state to avoid future stress corrosion cracking upon exposure of hot water or steam at the transition segments. This is particularly important for the outboard transition area 56 which is closest to the external boundary or interface of the vessel. Instead of shot peening the transition segments, a plating tool can be inserted in tube 12 as previously described for roll tool 40, and the inner diameter surface 51 of the tube can be plated, such as with nickel, along the transition segments to avoid future stress corrosion cracking.

Figure 5:
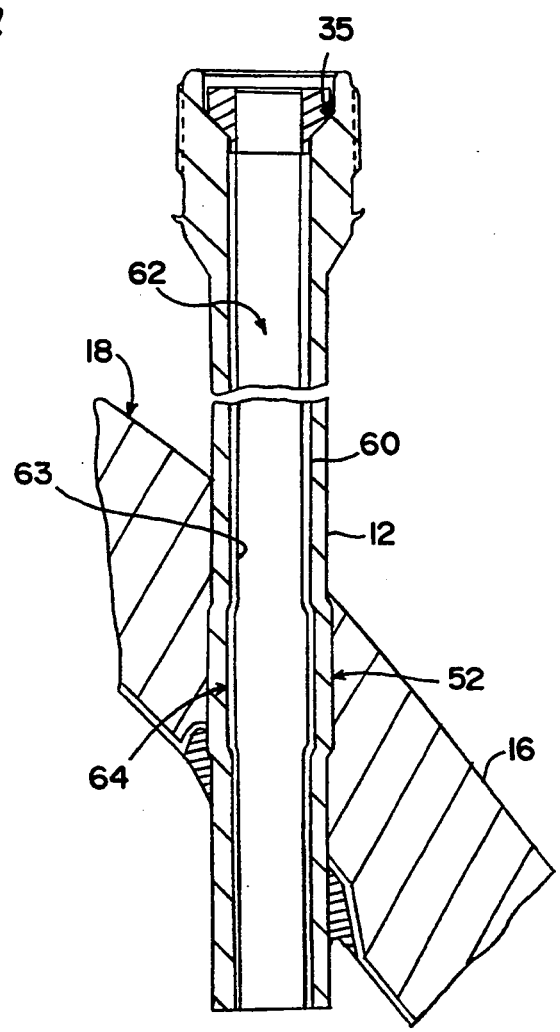
FIG. 5 is a broken sectional view of the nozzle of FIG. 3 following insertion of a sleeve within the nozzle and rolling of the inside diameter of the sleeve.

Another method of repairing Inconel 600 nozzles of pressure vessels according to the present invention is illustrated in FIG. 5. The method illustrated in FIG. 5 is similar to the method illustrated in FIGS. 1–4 except that, after rolling the inside diameter of tube 12 as previously described, a corrosion resistant sleeve or tube 60 is inserted or placed in the lumen 32 of tube 12. Sleeve 60 is made in its entirety from Inconel 690 material which has a higher chromium content and greater immunity to cracking than Inconel 600. Inconel 690 is an alloy including, by weight, 58% minimum nickel, 27% to 31% chromium and 7% to 11% iron. Sleeve 60 has an outer diameter to be closely received in lumen 32 with minimal gap or clearance between the inner diameter of tube 12 and the outer diameter of sleeve 60. The inner diameter of sleeve 60 defines a lumen or passage 62 therethrough sufficiently large to permit the functions previously carried out via the lumen 32 of the nozzle to be performed via the passage 62, the sleeve having a wall thickness in the range of ¼ the wall thickness of tube 12 to equal the wall thickness of tube 12. The length of sleeve 60 is selected in accordance with the length of nozzle 10 to extend along the entire length of nozzle 10 susceptible to cracking. As illustrated in FIG. 5, sleeve 60 extends the entire length of lumen 32 and substantially the entire length of the nozzle 10, the sleeve 60 extending the entire length of tube 12 except for enlarged recess 35. Where recess 35 is not provided and lumen 32 extends the entire length of tube 12, sleeve 60 can also extend the entire length of tube 12 and, therefore, the nozzle. Once sleeve 60 has been positioned within the previously rolled tube 12, a roll tool, such as roll tool 40, is inserted within the passage 62 of the sleeve. The roll tool is utilized to roll the inside diameter, i.e. inside diameter surface 63, of the sleeve 60 along the entire length thereof with a roll pressure of 50,000 to 150,000 psi being applied to the sleeve inside diameter in the manner previously described for rolling the inside diameter of tube 12. Accordingly, sleeve 60 is expanded along the entire length thereof causing the outside diameter of the sleeve to engage the inside diameter of the nozzle in an interference fit with a circumferential section 64 of the sleeve moving into rolled area 52 of tube 12. Once rolled, sleeve 60 seals off and covers up cracked areas of nozzle 10 as well as all areas of nozzle 10 subject to potential stress corrosion cracking. Sleeve 60 further ensures the structural integrity of the nozzle 10 in case of future cracking in the tube 12. Where sleeve 60 is utilized, nozzle 10 has the same surface yielding, interference fit pressure and transition segment characteristics as those previously described for the repair method wherein the sleeve is not utilized. Additionally, by utilizing sleeve 60, the need for shot peening or plating of the transition segments can be eliminated.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A method of repairing a cracked tubular nozzle of a pressure vessel having an external wall forming an interface between the interior of the vessel and externally thereof comprising the steps of:

inserting a roll tool within the lumen of said cracked tubular nozzle made of Inconel 600 material and extending through the external wall to provide communication between the interior of the vessel and externally thereof;

mechanically rolling the inside diameter of a portion of the nozzle disposed within the external wall with the roll tool;

applying a roll pressure in the range of 50,000 to 150,000 psi along the inside diameter of the nozzle with the roll tool to form a circumferential rolled section in the nozzle to prevent leakage from the interior of the vessel to externally thereof; and withdrawing the roll tool from the nozzle.

2. A method of repairing a tubular nozzle as recited in claim 1 wherein said step of inserting includes inserting the roll tool within the lumen of a nozzle welded to the external wall and having an outside diameter in the range of ⅛ inch to 6 inches.

3. A method of repairing a tubular nozzle as recited in claim 2 wherein said step of inserting includes inserting the roll tool within the lumen of a nozzle having a wall thickness in the range of ⅛ inch to ¾ inch.

4. A method of repairing a tubular nozzle as recited in claim 3 wherein said step of applying roll pressure includes longitudinally moving a tapered mandrel of the roll tool to move rolls of the roll tool in a direction radially outwardly of a longitudinal axis of the nozzle.

5. A method of repairing a tubular nozzle as recited in claim 1 further including, after said step of withdrawing the roll tool, the steps of positioning a tubular sleeve within the lumen of the nozzle and mechanically rolling the inside diameter of the sleeve along the entire length of the sleeve.

6. A method of repairing a cracked tubular nozzle made of Inconel 600 material and extending through an external wall of a pressure vessel to provide communication between the interior of the pressure vessel and externally thereof comprising the steps of:
mechanically rolling the inside diameter of a portion of the nozzle disposed within the external wall; and
forming, in response to said mechanical rolling, a circumferential rolled section in the nozzle having a wall thickness 3% to 12% less than the wall thickness of unrolled sections of the nozzle and an outside diameter less than 1% greater than the outside diameter of the unrolled sections of the nozzle to prevent leakage from the interior of the vessel to externally thereof.

7. A method of repairing a tubular nozzle as recited in claim 6 wherein said step of mechanically rolling includes applying a roll pressure to the inside diameter of the nozzle to cause surface yielding of the outside diameter of the nozzle along the portion of the nozzle being mechanically rolled.

8. A method of repairing a tubular nozzle as recited in claim 7 wherein said step of applying roll pressure includes producing a stress of approximately 60,000 psi in the portion of the nozzle being mechanically rolled.

9. A method of repairing a tubular nozzle as recited in claim 6 wherein said step of forming includes creating an interference fit pressure between the outside diameter of the nozzle and the external wall of the vessel of approximately 2,500 psi in excess of the operating pressure for the vessel.

10. A method of repairing a tubular nozzle as recited in claim 9 wherein said step of creating an interference fit pressure includes creating an interference fit pressure in the range of 3,000 to 10,000 psi between the outside diameter of the nozzle and the external wall of the vessel.

11. A method of repairing a tubular nozzle as recited in claim 6 wherein said step of forming includes forming the rolled section to have a length as large as possible while remaining within the thickness of the external wall of the vessel.

12. A method of repairing a tubular nozzle as recited in claim 11 wherein said step of forming includes forming the rolled section to have a length 1 to 4 times the outside diameter of the nozzle.

13. A method of repairing a tubular nozzle as recited in claim 6 wherein said step of forming includes forming circumferential transition segments in the nozzle between the rolled section and non-rolled sections of the nozzle.

14. A method of repairing a tubular nozzle as recited in claim 13 wherein said step of forming the transition segments includes forming the transition segments to have a radius of curvature in the range of ½ inch to 2 inches.

15. A method of repairing a tubular nozzle as recited in claim 14 and further including the step of shot peening the transition segments.

16. A method of repairing a tubular nozzle as recited in claim 14 and further including the step of plating the transition segments with nickel.

17. A method of repairing a cracked tubular nozzle extending through an external wall of a pressure vessel to provide communication between the interior of the vessel and externally thereof comprising the steps of:
mechanically rolling the inside diameter of a portion of the nozzle disposed within the external wall to form a circumferential rolled section in the nozzle;
inserting a tubular sleeve within the lumen of the nozzle to extend along the entire length of the nozzle susceptible to cracking; and
rolling the inside diameter of the sleeve along the entire length of the sleeve to create an interference fit between the outside diameter of the sleeve and the inside diameter of the nozzle to prevent leakage from the interior of the vessel to externally thereof.

18. A method of repairing a tubular nozzle as recited in claim 17 wherein said step of inserting includes inserting a sleeve made of Inconel 690 material in its entirety.

19. A method of repairing a tubular nozzle as recited in claim 18 wherein said step of rolling the sleeve includes applying a roll pressure in the range of 50,000 to 150,000 psi to the inside diameter of the sleeve.

20. A method of repairing a tubular nozzle as recited in claim 19 wherein said step of rolling the sleeve includes mechanically rolling the inside diameter of the sleeve with a roll tool.

* * * * *